United States Patent
Boss et al.

(10) Patent No.: US 9,424,736 B2
(45) Date of Patent: Aug. 23, 2016

(54) ASSET-BASED WEATHER AND EVENT ALERTS

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/478,413

(22) Filed: Sep. 5, 2014

(65) Prior Publication Data

US 2016/0071398 A1 Mar. 10, 2016

(51) Int. Cl.
*G08B 25/00* (2006.01)
*G06Q 30/02* (2012.01)
*H04L 29/08* (2006.01)
*H04W 4/02* (2009.01)

(52) U.S. Cl.
CPC ............ *G08B 25/00* (2013.01); *G06Q 30/0252* (2013.01); *G06Q 30/0269* (2013.01); *H04L 67/306* (2013.01); *H04W 4/02* (2013.01)

(58) Field of Classification Search
CPC ........... G06Q 30/0252; G06Q 30/0269; H04L 67/306; H04W 4/02
USPC .............. 340/686.6, 539.28, 601; 455/404.1, 455/414.1, 456.2
See application file for complete search history.

(56) References Cited

U.S. PATENT DOCUMENTS

| | | | | |
|---|---|---|---|---|
| 7,602,285 | B2 * | 10/2009 | Sznaider | G08B 21/10 340/539.28 |
| 8,229,467 | B2 * | 7/2012 | Root | H04W 4/02 455/456.2 |
| 8,611,927 | B2 * | 12/2013 | Root | H04W 4/02 455/404.1 |
| 8,634,814 | B2 * | 1/2014 | Root | H04L 67/306 455/414.1 |
| 9,094,798 | B2 * | 7/2015 | Root | H04W 4/02 |
| 2014/0351051 | A1 * | 11/2014 | Root | G06Q 30/0252 705/14.57 |

OTHER PUBLICATIONS

"Predictive modeling offers a clear view of the present and deeper insight into the future", IBM, <http://www-01.ibm.com/software/analytics/solutions/predictive-modeling/>, May 22, 2014.

"Climate Change and the Insurance Industry", Copyright 2014 Pax World Management LLC, <http://www.paxworld.com/advisors/approach/sustainability-research/key-issues-briefs/climate-change-and-the-insurance-industry>.

(Continued)

*Primary Examiner* — John A Tweel, Jr.
(74) *Attorney, Agent, or Firm* — Edward J. Wixted, III; John Pivnichny; Steven L. Fischer-Stawinski (57) ABSTRACT

In an approach for asset management, a processor identifies the location of an asset. A processor receives information specific to the location of the asset. A processor determines that an alert is required based on at least the asset, the location of the asset, and the information specific to the location of the asset. A processor generates an alert.

18 Claims, 4 Drawing Sheets

(56) References Cited

OTHER PUBLICATIONS

"Predictive Customer Interaction Management for Insurance Companies", TIBCO The Power of Now, Copyright TIBCO, <http://www.tibco.com/multimedia/predictive-customer-interaction-management-tcm8-9381.pdf>, 2011.

"Small and Medium Enterprises—vulnerability and resilience to extreme weather", A review for Oxfordshire County Council, Dec. 2009, UK Climate Impacts Programme, <http://www.ukcip.org.uk/wordpress/wp-content/CLARA/UKCIP_SME_resilence_extremeweather.pdf>.

"Extreme weather and climate events and public health responses", World Health Organization, Europe, Report on a WHO meeting Bratislava, Slovakia, Feb. 9-10, 2004, <http://www.eird.org/isdr-biblio/PDF/Extreme%20weather%20and$20climate@20events.pdf>.

* cited by examiner

FIG. 5

ASSET-BASED WEATHER AND EVENT ALERTS

BACKGROUND OF THE INVENTION

The present invention relates generally to the field of asset management and more particularly to alerts and suggestions based on asset-specific qualities and surrounding environment events and information.

Asset management refers to anything that monitors and maintains things of value to an entity or group. Asset management may apply to tangible assets, such as buildings, vehicles, bicycles, or boats. Asset management may also apply to intangible assets, such as goodwill or intellectual property. Within an asset management system a registry may be created to inventory the identity of the asset, the owner of the asset, the age of the asset, a price evaluation indicating the projected worth of the asset, or other relevant data.

Asset management may involve managing stationary or mobile assets. With mobile assets, real-time locating systems (RTLSs) may be used to track the location of assets. RTLSs automatically identify and track the location of assets in real time. Wireless RTLS tags are attached to assets, and typically a fixed reference point receives wireless signals from the RTLS tag to determine the asset location. RTLSs usually use some form of radio frequency communication, but may use optical or acoustic technology in addition to, or instead of, radio frequency. Assets may also be tracked using a global positioning system (GPS). A GPS is a space-based satellite navigation system that provides location and time information. A GPS receiver may be located on an asset. A GPS receiver on the asset calculates the position of the asset by timing the signals sent by a number of GPS satellites. The timing signals sent by each GPS satellite transmit the time the message was sent and the satellite position at the time of the transmission. The GPS receiver uses transmission messages from multiple GPS satellites to determine the asset location. Most GPS receivers can derive direction and velocity from two or more position measurements.

SUMMARY

Aspects of an embodiment of the present invention disclose a method, a computer program product, and computer system for asset management. A processor identifies the location of an asset. A processor receives information specific to the location of the asset. A processor determines that an alert is required, based on at least the asset, the location of the asset, and the information specific to the location of the asset. A processor generates an alert.

DETAILED DESCRIPTION

Disclosed herein is an asset management system that is able to catalog, receive, and use asset information to alert users to take an action to avoid, maintain or minimize damage to an asset. Embodiments of disclosed asset management systems (AMSs) may access asset specific information in a registry (e.g., year of purchase, design specifications, location of an immobile asset, etc.). The disclosed AMS may also access information databases which generate information of transient nature (e.g., weather information, insurance claim information, location data if the asset is non-stationary, etc.). Embodiments of the present invention recognize that weather and other events can have a detrimental effect on assets. Embodiments of the present invention may be able to access asset information from multiple sources, correlate the asset information, and may generate alerts and/or recommendations to a user or third party in order to better manage, maintain, and/or minimize damage to the managed asset.

Figure 1:
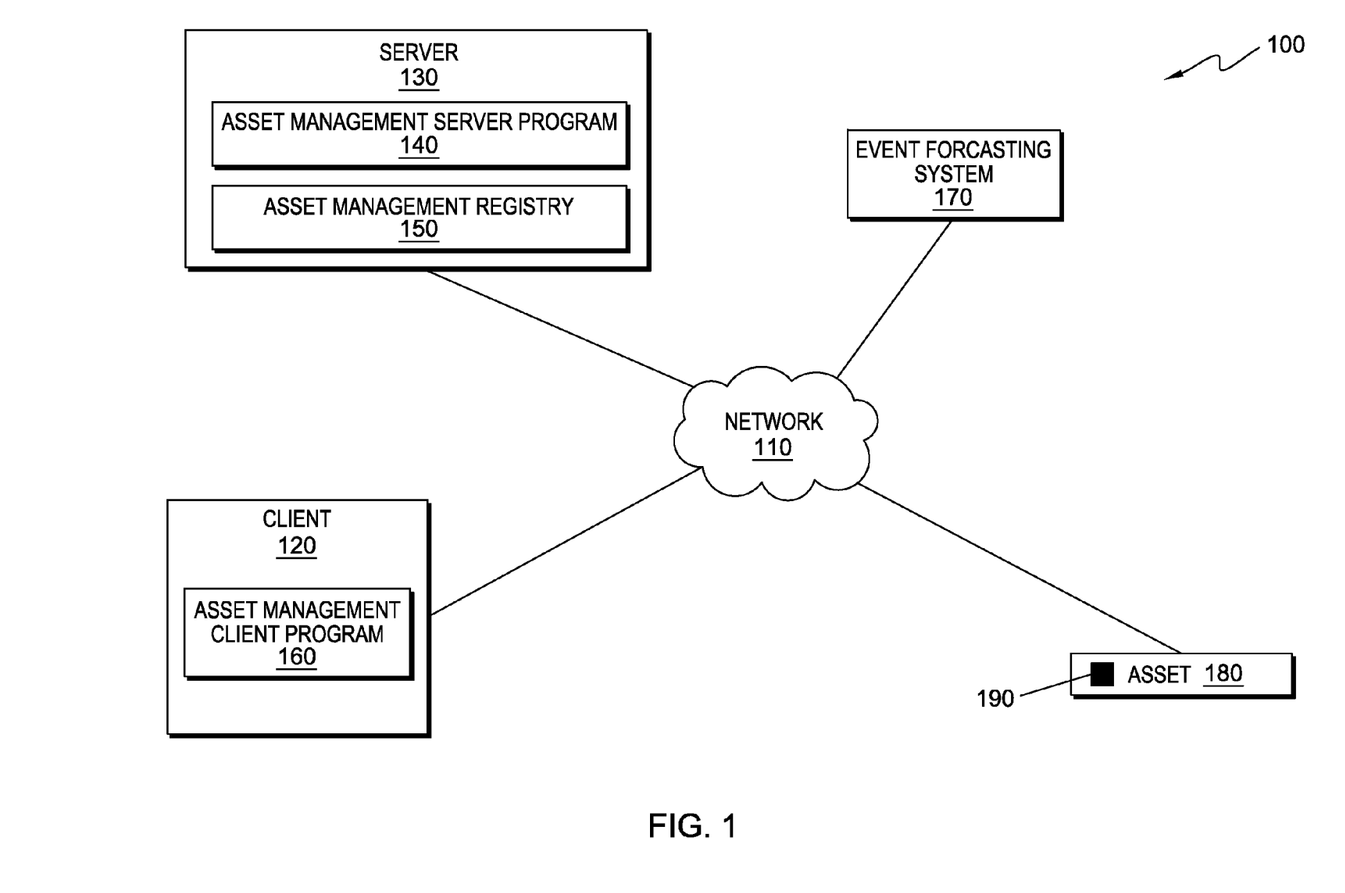
FIG. 1 illustrates a functional block diagram illustrating a distributed data processing environment, in accordance with one embodiment of the present invention.

The present invention will now be described in detail with reference to the Figures. FIG. 1 is a functional block diagram illustrating a distributed data processing environment, generally designated 100, in accordance with one embodiment of the present invention. Data processing environment 100 includes client 120, server 130, event forecasting system 170, asset 180, and real-time locating tag 190 interconnected over network 110. In some embodiments, asset 180 is a computing device connected via network 110. In other embodiments, asset 180 is some other type of asset (e.g., a sump pump, house, lawnmower, etc.) that may include real-time locating tag 190, and in such an embodiment, real-time location tag 190 may be connected via network 110.

Network 110 is a medium capable of providing communication links between various devices and computers connected within network data processing environment 100. Network 110 is capable of connecting client 120, server 130, event forecasting system 170, asset 180, and/or real-time locating tag 190 (located on asset 180). Network 110 may be a local area network (LAN), a wide area network (WAN) such as the Internet, any combination thereof, or any combination of connections and protocols that will support communication between client 120, event forecasting system 170, real-time locating tag 190, and server 130, in accordance with embodiments of the invention. Network 110 may include connections such as wire, wireless, communication links, or fiber optic cables. Data processing environment 100 may include additional servers, clients, information systems, and other devices not illustrated.

Server 130 may be a management server, a web server, or any other electronic device or computing system capable of processing program instructions, receiving data, and sending data. In some embodiments, server 130 may be a laptop computer, tablet computer, personal computer (PC), desktop computer, or any programmable electronic device capable of communicating with client 120, event forecasting system 170, asset 180, and/or real-time locating tag 190 via network 110. In other embodiments, server 130 may represent a server computing system utilizing multiple computers as a server system, such as in a cloud computing environment. In another embodiment, server 130 represents a computing system utilizing clustered computers and components to act as a single pool of seamless resources. Server 130 includes asset management server program 140 and asset management registry 150. In other embodiments, server 130 may include additional registries, repositories, or programs (not shown). Server 130 may include components, as depicted and described in further detail with respect to FIG. 5.

Asset management registry 150 may be any web document, program, list, database, catalog, or any other system capable of storing asset information and associated properties of assets (e.g., owner, value, susceptibility to damage, etc.). Assets may be anything of value to a group, individual or other entity. Assets may be tangible, such as automobiles, bicycles, houses, or sump pumps, or may be intangible, such as intellectual property or goodwill. Asset management registry 150 may store information regarding any number of properties associated with each asset managed by asset management server program 140. For example, asset management registry 150 may store information about events or disasters an asset is, or is not, prone to (e.g., some houses are prone to flooding and others are not). In one embodiment, asset management registry 150 may include a database of asset related services (e.g., being able to fix plumbing issues or having a spare garage to store a car), individuals who are able to perform such services (e.g., neighbors, repairmen, etc.), and/or individuals in need of such services. For example, asset management registry 150 may catalog individuals who own more cars than their garage can hold, as well as individuals who have spare lots available within their garage and are willing to let others use the extra space. In one embodiment, asset management registry 150 resides on server 130. In other embodiments, asset management registry 150 may reside on another server or another computing device, provided that asset management registry 150 is accessible to asset management server program 140. In another embodiment still, asset management registry 150 may receive, retrieve, or otherwise access information from other databases. For example, asset management registry 150 may receive information from a database (not shown) that catalogs automobile depreciation rates such that asset registry 150 may update an asset's value over time. In some embodiments, asset management registry 150 may receive asset information from user input, from other databases (not shown), or may otherwise receive asset information from other sources.

Asset management server program 140 operates to retrieve event forecasting information associated with the location of assets stored to a repository, such as asset management registry 150, and send alerts or recommendations based on the event forecasting information and asset information. In one embodiment, asset management server program 140 is located on server 130. In another embodiment, asset management server program 140 is located on another server or computing device, provided asset management server program 140 is accessible to asset management client program 160 and/or event forecasting system 170, and provided asset management server program 140 has access to asset management registry 150, event forecasting system 170, asset management client program 160, asset 180, and/or real-time locating tag 190 via network 110. In some embodiments, asset management server program 140 is able to access, receive, and retrieve information from event forecasting system 170 and location information from real-time locating tag 190 (located on asset 180) via network 110. In some embodiments, asset management server program 140 is able to access additional databases and repositories containing other information (e.g., value, insurance information, etc.) about asset 180. Asset management server program 140 determines and generates asset specific alerts and/or recommendations for assets based on information retrieved from asset management registry 150, event forecasting system 170, and potentially other databases (not shown). In some embodiments, asset management server program 140 generates asset specific alerts and/or recommendations for immobile assets (e.g., houses), as described in further detail with respect to FIG. 2. In some embodiments, asset management server program 140 generates asset specific alerts and/or recommendations for mobile assets (e.g., cars) as described in further detail with respect to FIG. 3. Further, asset management server program 140 may generate asset specific alerts and/or recommendations for a combination of mobile and immobile assets.

In general, client 120 may be any electronic device or computing device capable of processing program instructions, sending and receiving data information, and communicating with server 130 over network 110. Client 120 may be, for example, a personal computer, desktop computer, laptop computer, netbook computer, tablet computer, personal digital assistant (PDA), smart phone, or other computation and/or communication device. Client 120 contains asset management client program 160. In some embodiments, client 120 may reside on an asset (e.g., a computer system inside a motor vehicle) or client 120 may be an asset itself (e.g., a smartphone or personal computer). Client 120 may include components, as depicted and described in further detail with respect to FIG. 5.

Asset management client program 160 may be a dedicated client asset management program, a function integrated within another program, or any other program or function that can communicate with asset management server program 140 and provide a user interface for viewing alerts, inputting asset information, and, in some embodiments, inputting location information (e.g., location of user, location of selected asset). In one embodiment, asset management client program 160 resides on client 120. In other embodiments, asset management client program 160 may reside on another computing device, provided asset management client program has access to, and is accessible to, asset management server program 140. In other embodiments, asset management client program 160 may perform the function of asset management server program 140.

Event forecasting system 170 is any system used to predict events relevant to a state of the assets managed by asset management server program 140. In one example embodiment, event forecasting system 170 may access predicted weather or natural disasters forecasts via the National Weather Service, personal weather stations, or other weather forecasting devices. In one embodiment, event forecasting system 170 is a weather forecasting location accessible by servers and computing devices over the Internet. In some embodiments, event forecasting system 170 has access to an insurance database and may access past insurance claims. In such an embodiment, event forecasting system 170 may communicate this insurance information to asset management server program 140 so that asset management server program is able to predict future dangers based on information such as the asset type, previous insurance claims, asset location, or other factors. For example, event forecasting system 170 may access past insurance claims indicating that a specific boating dock corresponds to the location of multiple boat insurance claims. Event forecasting system 170 may communicate the past insurance claims to asset management server program 140, or asset management server program 140 may retrieve the past insurance claims, via network 110. Event forecasting system 170 may retrieve or receive information related to a managed asset or the location of a managed asset from other resources (not shown) and may communicate with the other resources provided event forecasting system 170 is able to communicate the information to asset management server program 140 via network 110.

Asset 180 is an item of value to an entity or group. An asset may be tangible, such as a building, vehicle, bicycle, or boat. Assets may also be intangible, such as goodwill or intellectual property. In some embodiments Asset 180 is mobile. In other embodiments Asset 180 is stationary. In some embodiments Asset 180 includes a computing device (e.g., smartphone, car with a navigation system). In other embodiments Asset 180 is mobile and is affixed with a real-time locating tag, such as real-time locating tag 190. In other embodiments the location is manually entered, such as for a house or other immobile object.

Real-time locating tag 190 an object or device capable of identifying the location of asset 180. In the depicted embodiment, real-time locating tag 190 is located on asset 180. In some embodiments, real-time locating tag 190 is either a passive or active radio-frequency identification (RFID) tag. In another embodiment real-time locating tag 190 may be a global positioning system receiver tag capable of communicating with the global positioning system. The global positioning system is a space-based satellite navigation system that provides location and time information to real-time locating tag 190 when real-time locating tag 190 is a global positioning system receiver tag. In yet another embodiment, real-time locating tag 190 may operate similar to a mobile phone and use multilateration techniques to determine the location of asset 180. Asset management server program 140 may retrieve location data from real-time location tag 190 via network 110.

Figure 2:
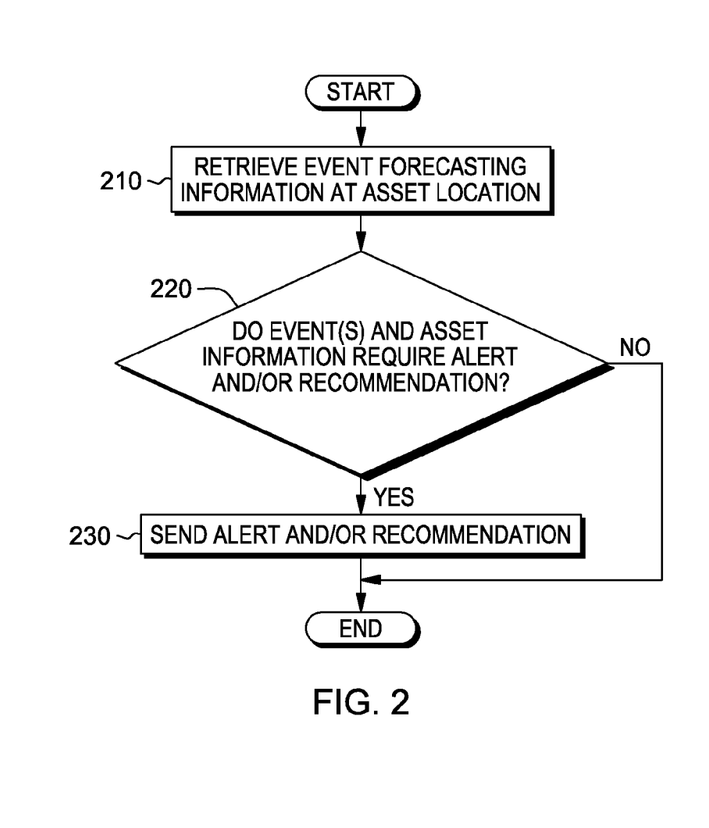
FIG. 2 is a flowchart depicting operation steps of an asset management server program within the data processing environment of FIG. 1, for managing assets and sending user alerts for stationary assets, in accordance with one embodiment of the present invention.

FIG. 2 is a flowchart depicting operational steps of asset management server program 140 executing within the data processing environment of FIG. 1, in accordance with an embodiment of the present invention. Asset management server program 140 operates to monitor asset 180, via information corresponding to asset 180 stored in asset management registry 150, and to monitor event prediction data associated with the location of asset 180, accessed via event forecasting system 170, to enable asset management server program 140 to generate alerts and make recommendations to a user of asset management client program 160. In some embodiments, the user of asset management client program 160 may be the asset user. In other embodiments, the user of asset management client program 160 may be a third party such as an insurance company, or someone in close proximity to the asset user. FIG. 2 represents the steps asset management server program 140 may take in an embodiment of the present invention when asset 180 is immobile.

In one embodiment, initially, a user may register one or more assets, including asset 180, with asset management server program 140 via a user interface provided by asset management client program 160 on client 120. Registering an asset may include providing input such as the type of asset (e.g., make, model, and year of a car), asset condition, asset location, or other applicable information. In other embodiments, asset management server program 140 may receive asset information from another party, such as the asset manufacturer, the design specifications, or an outside database. In other embodiments still, asset management server program 140 may receive asset information from any combination of users and databases. Upon receiving the asset information, asset management server program 140 may store the asset information to a repository, such as asset management registry 150.

In step 210, asset management server program 140 receives event forecasting information from event forecasting system 170. In some embodiments, event forecasting system 170 may push, or otherwise forward, event forecasting information to asset management server program 140. In other embodiments, asset management server program 140 may retrieve information corresponding to asset 180 based on the stored location or other information associated with asset 180. For example, asset management server program 140 may receive weather forecasting information (e.g., chance of rain, snow storm warning, etc.) from event forecasting system 170. Event forecasting system 170 may have accessed weather forecasting information from a weather reporting system, a personal weather station, or some other weather forecasting service. In some embodiments, asset management server program 140 may communicate directly with a weather forecasting device via network 110. For example, asset management server program 140 may receive updates from a pulse Doppler weather radar detection system, a meteorological radar system, or a personal weather station. In some embodiments, asset management server program 140 may receive event forecasting information from more than one event forecasting system. In some embodiments, event forecasting system 170 may retrieve traffic information, insurance claim information, or other information that may predict events that may damage or otherwise affect asset 180. In some embodiments, asset management server program 140 may frequently, regularly, or semi-regularly receive event information from event forecasting system 170. In other embodiments, asset management server program 140 may frequently, regularly, or semi-regularly retrieve event data from event forecasting system 170.

In decision 220, asset management server program 140 determines if the asset information stored in asset management registry 150 corresponding to asset 180 and the information received from event forecasting system 170 corresponding to asset 180 requires an alert and/or a recommendation. In one embodiment, asset management server program 140 will compare asset information from asset management registry 150 to received event forecasting information from event forecasting system 170. For example, in one embodiment asset 180 may be a home. Information about the home is cataloged in asset management system registry 150, for instance that the home is located in a hurricane area and that the home is equipped with retractable hurricane shutters. If asset management server program 140 receives information from event forecasting system 170 that a hurricane is predicted in the hurricane area of the home, then asset management server program 140 will compare this event information to the asset information stored in asset management registry 150. Asset management server program 140 will then determine whether an alert and/or recommendation specific to the home should be made, such as an alert to the homeowner to close the home's retractable hurricane shutters. In other embodiments, asset management server program 140 may communicate with an automated system located on the asset, such as alerting an automated system (not shown) to close the home's retractable hurricane shutters.

In some embodiments, asset registry 150 may include a catalog of asset specific events that require an alert or suggestion, and asset management server program 140 may determine whether an alert or recommendation is required based on a comparison between the event forecasting information and the corresponding catalog entry. For example, asset registry 150 may include information indicating that a particular house (house 1) may require a flood warning if more than five inches of rain is predicted, while another house (house 2) may require a flood warning only if more than seven inches of rain is predicted. In such an example, if asset management server program 140, receives weather information from event forecasting system 170 that six inches of rain is predicted, then asset management server program 140 will generate an alert or suggestion for house 1 but not alert or make suggestions for house 2.

In another embodiment, asset management server program 140 may determine whether an alert and/or recommendation should be sent to an individual other than the asset's user. For example, asset management server program 140 may cause asset management registry 150 to store information about an asset's owner and information about individuals and assets in close proximity to the asset owner. In another embodiment, asset management server program 140 may determine an alert and/or recommendation should be sent to another party, such as an insurance company. Asset management registry 150 may store information about how an automobile owner's (person 1) home does not have a garage, as well as information about how the automobile owner's neighbor (person 2) has a two car garage but only owns one car. If asset management server program 140 receives information of inclement weather (e.g., a hail storm) from event forecasting system 170, then asset management server program 140 may determine that an alert or recommendation should be sent to person 2 (e.g., an alert to ask person 2 if person 1 may store person 1's automobile in person 2's empty garage for the duration of the expected hail storm), or asset management server program 140 may determine that an alert or recommendation should be sent to person 1 (e.g., an alert to offer person 2's empty garage to person 1), or asset management system may determine that both alerts or recommendations should be sent.

If asset management server program 140 determines neither an alert nor a recommendation is required (decision 220, no branch), based on the information identified above, the function is complete. If asset management server program 140 determines an alert and/or a recommendation is required (decision 220, yes branch), asset management server program will proceed to step 230.

In step 230 asset management server program 140 sends an alert or suggestion to asset management client program 160, client 120, or another device, if the result of decision 220 is that the relevant asset information indicated an alert or suggestion is necessary (decision 220, yes branch). In one embodiment, asset management server program 140 may send an alert or recommendation to an intended recipient by sending a text or multimedia message. In another embodiment, asset management server program 140 may send an alert or recommendation via an email, push notification, audio recording to a cell phone or landline, or by another method of communication. In general, asset management server program 140 may alert or make a suggestion in any way that communicates, attempts to communicate, or otherwise indicates the alert or recommendation to the intended recipient(s).

Figure 3:
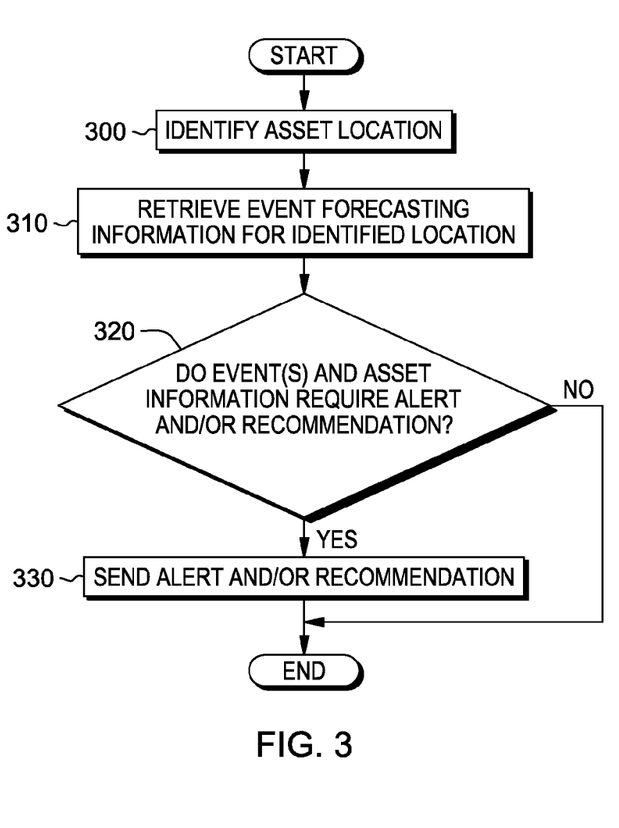
FIG. 3 is a flowchart depicting operation steps of an asset management server program within the data processing environment of FIG. 1, for managing assets and sending user alerts for mobile assets, in accordance with one embodiment of the present invention.

FIG. 3 is a flowchart depicting operational steps of asset management server program 140 executing within the data processing environment of FIG. 1, in accordance with an embodiment of the present invention. Asset management server program 140 operates to monitor asset 180, via information corresponding to asset 180 stored in asset management registry 150, and to monitor event prediction data associated with the location of asset 180, accessed via event forecasting system 170, to enable asset management server program 140 to generate alerts and make recommendations to a user. FIG. 3 represents the steps asset management server program 140 may take in an embodiment of the present invention when asset 180 is mobile.

In one embodiment, initially, a user may register one or more assets, including asset 180, with asset management server program 140 via a user interface provided by asset management client program 160 on client 120. Registering an asset may include providing input such as the type of asset (e.g., make, model, and year of a car), asset condition or other applicable information. A user or may register real-time locating tag 190, which is located on asset 180, with asset management server program 140. Upon receiving the asset information, asset management server program may store the asset information to a repository, such as asset management registry 150.

In step 300 asset management server program 140 identifies the location of asset 180. In some embodiments, asset management server program 140 receives location information from a real-time location system (not shown) operable with real-time locating tag 190 which is located on asset 180. In other embodiments, asset 180 incorporates similar functionality to real-time location tag 190 with the device that comprises asset 180. For example, asset 180 may be a smartphone, laptop computer, or automobile equipped with GPS or cellular service. In some embodiments, asset management server program 140 may make predictions about the future location of asset 180 using speed and direction information received from real-time location system tag 190. In some embodiments, asset management server program 140 may receive location information from external sources. For example, asset management system may receive information from a user registered as a car's owner that the car will be driven from New York to Philadelphia during a specified time period. In some embodiments, asset management server program 140 may receive information that the car owner is driving to Philadelphia from the car owner's cellular phone search history (i.e., search history of client 120) or a global positioning system device, or other device that asset management server program 140 is capable of communicating with.

In step 310 asset management server program 140 receives event forecasting information from event forecasting system 170. In some embodiments, event forecasting system 170 may push, or otherwise forward, event forecasting information to asset management server program 140. In other embodiments, asset management server program 140 may retrieve information corresponding to asset 180 based on the location of real-time locating tag 190 affixed with asset 180 or other information associated with asset 180. For example, asset management server program 140 may receive weather forecasting information (e.g., chance of rain, snow storm warning, etc.) from event forecasting system 170. Event forecasting system 170 may have accessed weather forecasting information from a weather reporting system, a personal weather station, or some other weather forecasting service for the weather at the location of real-time locating tag 190 on asset 180. In some embodiments, asset management server program 140 may communicate directly with a weather forecasting device via network 110. For example, asset management server program 140 may receive updates from a pulse Doppler weather radar detection system, a meteorological radar system, or a personal weather station. In some embodiments, asset management server program 140 may receive event forecasting information from more than one event forecasting system. In some embodiments, event forecasting system 170 may retrieve traffic information, insurance claim information, or other information that may predict events that may damage or otherwise affect asset 180. In some embodiments, asset management server program 140 may frequently, regularly, or semi-regularly receive event information from event forecasting system 170. In other embodiments, asset management server program 140 may frequently, regularly, or semi-regularly retrieve event data from event forecasting system 170.

In decision 320 asset management server program 140 determines if the asset information stored in asset management registry 150 and the information received from event forecasting system 170, both for asset 180 in general and for asset 180 given asset 180's location (indicated by real-time locating tag 190), requires an alert and/or a recommendation. In one embodiment, asset management server program 140 will compare asset information from asset management registry 150 to received event forecasting information from event forecasting system 170. For example, in one embodiment asset 180 may be a boat. Information about the boat is cataloged in asset management system registry 150 and real-time locating tag 190 identifies that the boat is on a particular lake. Asset management client program 160 receives this location information from real-time locating tag 190. Asset management client program 160 then receives event information about the lake from event forecasting system 170, for instance that a particular dock has been the site of twelve insurance claims whereas a different dock nearby has not been the site of any insurance claims. Asset management registry 150 will then determine if an alert and/or recommendation specific to the home should be made, such as an alert to the boat owner to dock the boat at the dock with no previous insurance claims.

Asset management server program 140 receives location information from real-time locating tag 190 indicating where the automobile is located. Asset management server program 140 also receives weather information for the automobile's location from event forecasting system 170 (e.g., it is about to rain). Asset management server program 140 will correlate the information retrieved from asset management registry 150 with the information asset management server program 140 receives from real-time locating tag 190 and event forecasting system 170 to determine if an alert or suggestion is necessary.

In some embodiments, asset registry 150 may include a catalog of asset specific events that require an alert or suggestion, and asset management server program 140 may determine whether an alert or recommendation is required based on a comparison between the event forecasting information and the corresponding catalog entry. For example, a particular car (e.g., a convertible) may require a specific warning if any rain is predicted for its location or projected future location while another car (e.g., a van) may require a different warning if any rain is predicted for its location or projected future location. In such an example, if asset management server program 140 received weather information from event forecasting system 170 that both vehicles would soon approach a location with rain, asset management server program 140 will generate different alerts for the different vehicles (e.g., convertible is warned to put the top up and van is told to close the windows).

If asset management server program 140 determines neither an alert nor a recommendation is required (decision 230, no branch), based on the information identified above, the function is complete. If asset management server program 140 determines an alert and/or a recommendation is required (decision 320, yes branch), asset management server program will proceed to step 330.

In step 330 asset management server program 140 sends an alert or suggestion to asset management client program 160, client 120, or another device, if the result of decision 320 is that the relevant asset information indicated an alert or suggestion is necessary (decision 320, yes branch). In one embodiment, asset management server program 140 may send an alert or recommendation to an intended recipient by sending a text or multimedia message. In another embodiment, asset management server program 140 may send an alert or recommendation via an email, push notification, audio recording to a cell phone or landline, or by another method of communication. In general, asset management server program 140 may alert or make a suggestion in any way that communicates, attempts to communicate, or otherwise indicates the alert or recommendation to the intended recipient(s).

Figure 4:
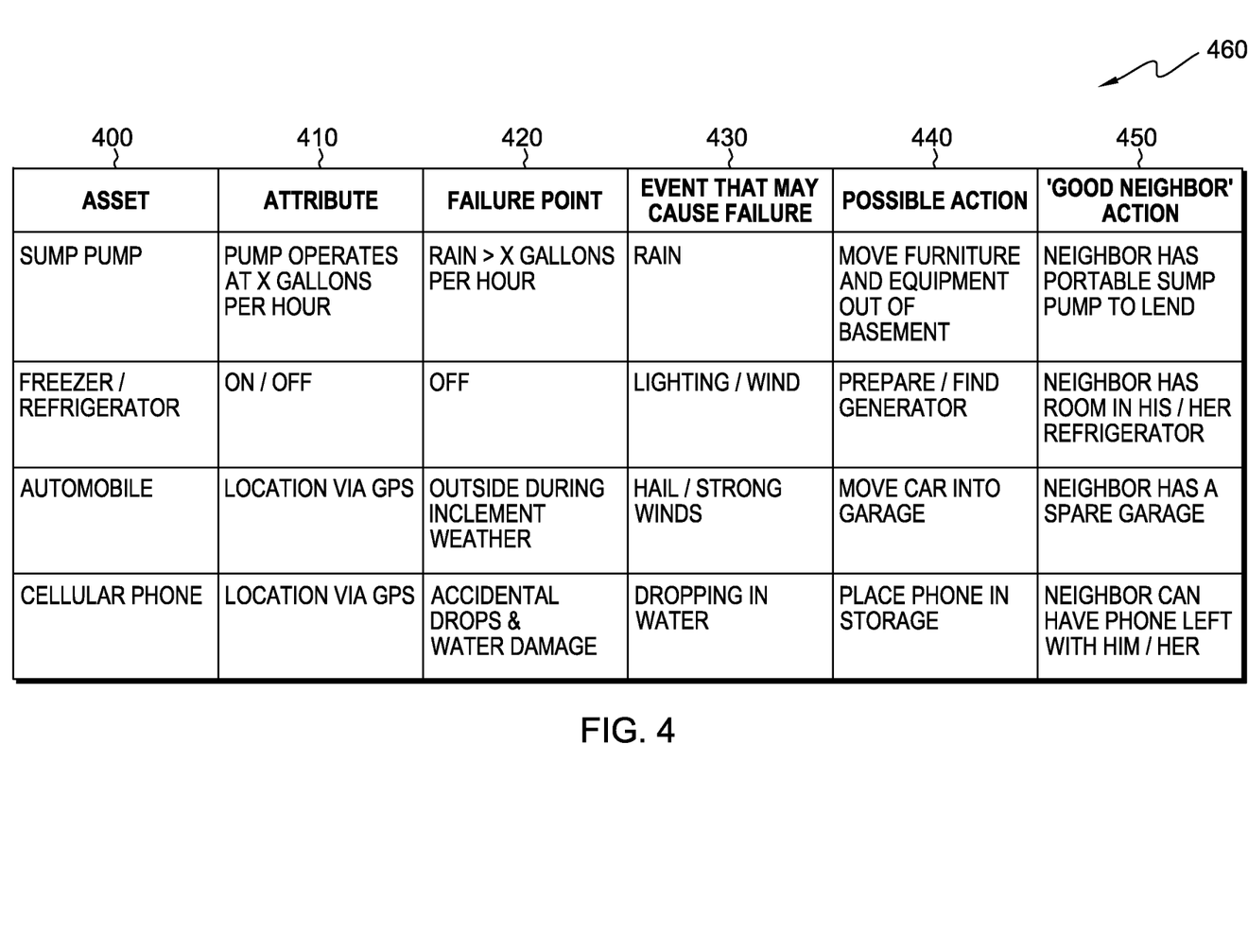
FIG. 4 is an exemplary registry of asset information that may be used by an asset management server program within the data processing environment of FIG. 1, in accordance with embodiments of the present invention.

FIG. 4 is an exemplary table of information that may be stored in asset management registry 150 and used by asset management server program 140. Table 460 provides an example of assets that asset management server program 140 may manage, asset specific information stored to asset management registry 150, and the alerts or recommendations that asset management server program 140 may generate. FIG. 4 is intended as an illustrative example and not as an architectural limitation for the present invention. In some embodiments, asset management registry 150 may include a catalog containing different information. In some embodiments, asset management registry 150 may include a catalog of asset information according to a different organizational method.

Column 400 contains identifying information about the assets managed by asset management server program 140. In the depicted example the assets are a sump pump, a freezer/refrigerator, an automobile, and a cellular phone. The sump pump and freezer/refrigerator are examples of "immobile assets" as their location is not frequently changing. Asset management server program 140 may manage the sump pump and freezer/refrigerator according to the steps described in FIG. 2. The automobile and cellular phone are examples of mobile assets as their location may frequently change. Asset management server program 140 may manage the automobile and cell phone according to the steps described in FIG. 3.

Column 410 contains attributes that the various assets have. Column 410 contains attributes or properties relevant to each asset that may be relevant to overall asset management. Column 410 depicts that the sump pump is only capable of operating at x gallons per hour, the freezer/refrigerator is capable of being on or off, the automobile's location may be tracked using the automobile's global positioning system feature, and the cell phone's location may be tracked using the cell phone's global positioning system feature. In some embodiments, column 410 may contain additional asset information relevant to overall asset management and maintenance. In one embodiment, the attributes that asset management registry stores in column 410 may be provided by the owner (e.g., if freezer/refrigerator is kept in the basement or kitchen). In another embodiment, the attributes are associated with the asset's design specifications (e.g., the operating capacity of the sump pump).

Column 420 contains example failure point(s) associated with the assets that asset management server program 140 manages. In some embodiments, the failure point(s) may be considered attributes and cataloged with other asset attributes. In the depicted example, the sump pump will fail if the amount of rain exceeds the sump pump's x gallons per hour operating capacity, the freezer/refrigerator will fail if the freezer/refrigerator is turned off, the automobile will fail if the automobile is outside during inclement weather (e.g., a hailstorm or a tornado), and the cell phone will fail if it is dropped in and/or otherwise exposed to water. In some embodiments, column 420 may contain additional asset failure points.

Column 430 contains example event(s) that may lead to the associated asset's failure points. In the depicted example the sump pump may fail if there is rain, the freezer/refrigerator may fail during a lightning storm or if there are strong winds, the automobile may fail if there is a hail storm or if there are strong winds, and the cell phone may fail if it is dropped while near water or on a boat. These events are meant as illustrative examples and not as an exhaustive or comprehensive list. In some embodiments asset management server program 140 will compare information received from event forecasting system 170 to the events contained in column 430. For example, when asset management system receives information from event forecasting system 170 that a given location is going to experience strong winds, asset management system may parse asset management registry 150 to see if 'strong winds' is an event that may cause failure. Asset management registry 150 may then identify that 'strong winds' is an event that may cause failure for the freezer/refrigerator and for the automobile. In other embodiments, events that may cause failure may be cataloged differently. In some embodiments, asset management registry 150 may link the information obtained from asset management registry 150 and event forecasting system 170 according to a different manner.

Column 440 lists possible actions that may be taken that are specific to the asset and the event that may cause failure in that asset. The possible actions contained in column 440 are meant as illustrative examples specific to the exemplary events that may cause failure in column 430 and are not meant as a comprehensive or exhaustive list. These actions illustrate alerts and/or recommendations that asset management server program 140 may send to a user. In the depicted example, asset management server program 140 may recommend that the sump pump user should move basement furniture and equipment out of the basement, the freezer/refrigerator user should either prepare or obtain a generator, the automobile user should move the automobile into a garage, and the cell phone user should place the cell phone in a waterproof storage compartment. In other embodiments, asset management server program 140 may provide asset specific alerts (e.g., alerting the sump pump user that the sump pump may fail) without offering an asset specific recommendation. In still other embodiments, asset management server program 140 may provide a combination of asset specific alerts, information, and recommendations.

Column 450 lists possible "Good Neighbor" actions that may be associated with an asset, such as asset 180 (see FIG. 1). The possible actions contained in column 450 are meant as illustrative examples and not as a comprehensive or exhaustive list. The "Good Neighbor" actions in column 450 represent actions related to asset maintenance that may be taken by someone other than the asset's owner or user. For example, asset management server program 140 may alert the sump pump user's neighbor that the sump pump is about to fail and suggest the neighbor offer his or her portable sump pump to the failing sump pump's user. Also illustrated is asset management server program 140 recommending that a neighbor offer the spare space in his or her fridge, offer the use of his or her spare garage, or offer a place to store a cell phone. In some embodiments, asset management registry 150 may create a database of users and "good neighbor" actions the user is capable of performing (e.g., loaning a snowplow, moving furniture). In some embodiments, asset management server program 140 may create a social network of users and "good neighbor" actions the user is capable to performing and connecting the "good neighbor" users to users who are in need of a particular "good neighbor" service. Column 450 illustrates asset specific recommendations asset management system may give in some embodiments of the present invention.

In some embodiments, the alert or recommendation may be generated by a separate system, able to communicate with asset management registry 140. For example, the separate system may be an insurance provider. An insurance provider may wish to lower the number of claims filed and reduce the number of accidents. In such an example, an insurance company may offer discounts or other incentives to a user for following said recommendations. In some embodiments, this separate system may store alerts or recommendations on asset management registry 150 in a column not illustrated in FIG. 4. An insurance provider may also provide insurance discounts or other incentives to the neighbors who are prompted to be "good neighbors" by column 450.

Figure 5:
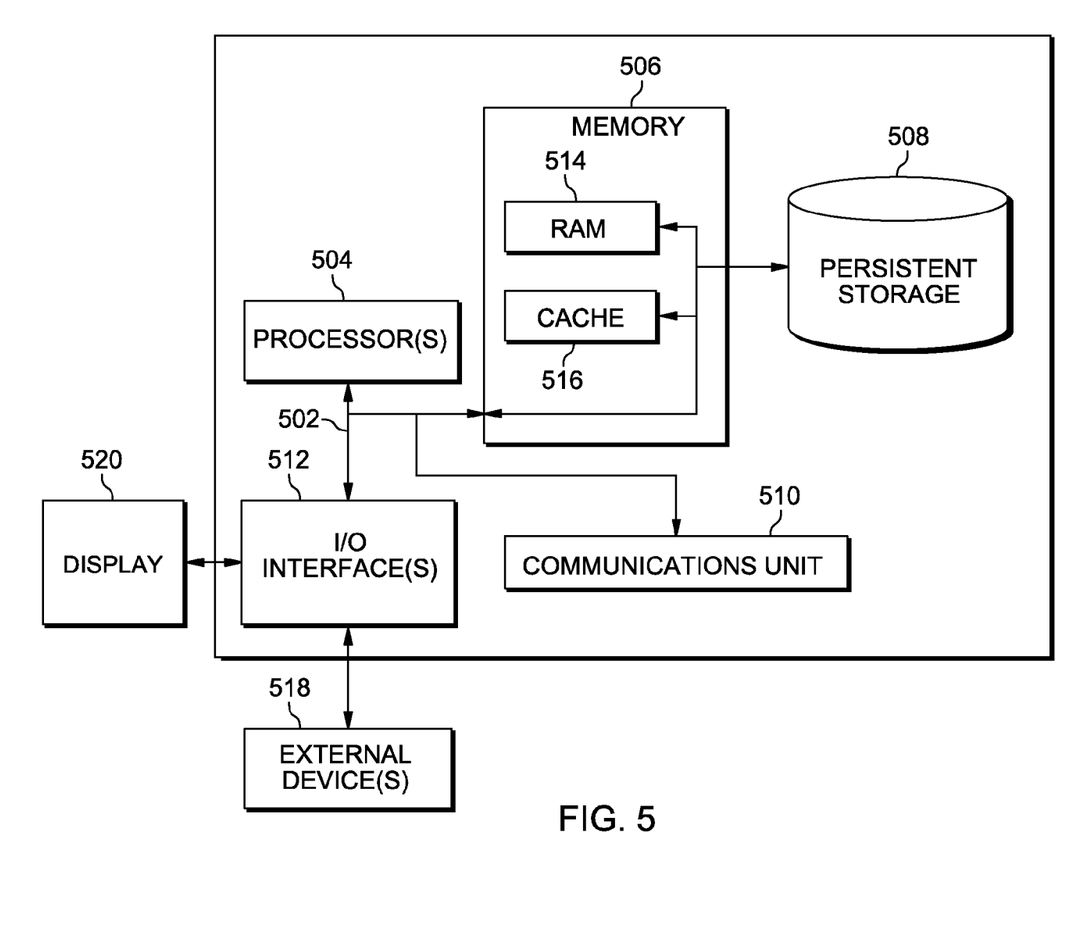
FIG. 5 is a block diagram of components of the asset management server program, and asset management client program executing the intelligent mapping program, in accordance with an embodiment of the present invention.

FIG. 5 is a block diagram of components of client 120 and server 130. It should be appreciated that FIG. 5 provides only an illustration of one implementation and does not imply any limitations with regard to the environments in which different embodiments may be implemented. Many modifications to the depicted environment may be made.

Client 120 and Server 130 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Asset management registry 150 and asset management server program 140 are stored in persistent storage 508 of server 130 for execution and/or access by one or more of the respective computer processors 504 of server 130 via one or more memories of memory 506 of server 130. Asset management client program 160 is stored in persistent storage 508 of client 120 for execution and/or access by one or more of the respective computer processors 504 of client 120 via one or more memories of memory 506 of client 120. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 110. In these examples, communications unit 510 includes one or more network interface cards. Communications unit 510 may provide communications through the use of either or both physical and wireless communications links. Asset management registry 150 and Asset management server program 140 may be downloaded to persistent storage 508 of server 130 through communications unit 510 of server 130. Asset management client program 150 may be downloaded to persistent storage 508 of client 120 through communications unit 510 of client 120.

I/O interface(s) 512 allows for input and output of data with other devices that may be connected to asset management server program 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, for example, asset management server program 140 and asset management registry 150, can be stored on such portable computer-readable storage media and can be loaded onto persistent storage 508 of server 130 via I/O interface(s) 512 of server 130. Software and data used to practice embodiments of the present invention, for example, asset management client program 160, can be stored on such portable computer-readable storage media and can be loaded onto persistent storage 508 of client 120 via I/O interface(s) 512 of client 120. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for asset management, the method comprising:
   identifying, by one or more processors, a location of an asset, the location of the asset being identified by at least a radio-frequency identification tag;
   receiving, by one or more processors, an insurance claim information about the location of the asset;
   determining, by one or more processors, that an alert is required, based on at least the asset, the location of the asset, and the insurance claim information about the location of the asset; and
   generating, by one or more processors, an alert.

2. The method of claim 1, wherein identifying a location of an asset comprises:
   receiving, by one or more processors, real-time location information of the asset; and
   identifying the location of the asset based on the received real-time location information.

3. The method of claim 1, wherein identifying a location of an asset comprises:
   accessing, by one or more processors, a repository, wherein the repository includes at least the asset and the location of the asset.

4. The method of claim 1, wherein determining that an alert is required is further based on information about the asset indicating an event that may affect the operation of the asset.

5. The method of claim 1, wherein the alert is a recommendation of an action to be taken with regard to the asset.

6. The method of claim 1, wherein identifying a location of an asset further comprises:
   receiving, by one or more processors, a weather forecast for the location of the asset.

7. A computer program product for asset management, the computer program product comprising:
   one or more computer readable storage media and program instructions stored on the one or more computer readable storage media, the program instructions comprising:
   program instructions to identify a location of an asset, the location of the asset being identified by at least a radio-frequency identification tag;
   program instructions to receive insurance claim information about the location of the asset;
   program instructions to determine that an alert is required, based on at least the asset, the location of the asset, and the insurance claim information about the location of the asset; and
   program instructions to generate an alert.

8. The computer program product of claim 7, wherein program instructions to identify a location of an asset comprise:
   program instructions to receive real-time location information of the asset; and
   program instructions to identify the location of the asset based on the received real-time location information.

9. The computer program product of claim 7, wherein program instructions to identify a location of an asset comprise:
   program instructions to access a repository, wherein the repository includes at least the asset and the location of the asset.

10. The computer program product of claim 7, wherein program instructions to determine that an alert is required is further based on information about the asset indicating an event that may affect the operation of the asset.

11. The computer program product of claim 7, wherein the alert is a recommendation of an action to be taken with regard to the asset.

12. The computer program product of claim 7, wherein program instructions to identify a location of an asset further comprises:
   program instructions to receive a weather forecast for the location of the asset.

13. A computer system for asset management, the computer system comprising:
   one or more computer processors, one or more computer readable storage media, and program instructions stored on the computer readable storage media for execution by at least one of the one or more processors, the program instructions comprising:
   program instructions to identify a location of an asset, the location of the asset being identified by at least a radio-frequency identification tag;
   program instructions to receive insurance claim information about the location of the asset;
   program instructions to determine that an alert is required, based on at least the asset, the location of the asset, and the insurance claim information about the location of the asset; and
   program instructions to generate an alert.

14. The computer system of claim 13, wherein program instructions to identify a location of an asset comprise:

program instructions to receive real-time location information of the asset; and program instructions to identify the location of the asset based on the received real-time location information.

15. The computer system of claim 13, wherein program instructions to identify a location of an asset comprise:

program instructions to access a repository, wherein the repository includes at least the asset and the location of the asset.

16. The computer system of claim 13, wherein program instructions to determine that an alert is required is further based on information about the asset indicating an event that may affect the operation of the asset.

17. The computer system of claim 13, wherein the alert is a recommendation of an action to be taken with regard to the asset.

18. The computer system of claim 13, wherein program instructions to identify a location of an asset further comprises:

program instructions to receive a weather forecast for the location of the asset.

* * * * *